(12) United States Patent
Klein et al.

(10) Patent No.: US 11,613,054 B2
(45) Date of Patent: Mar. 28, 2023

(54) SYSTEMS AND METHODS OF FORMING A PROFILE ELEMENT FOR SEALING A METAL DECK

(71) Applicant: Hilti Aktiengesellschaft, Schaan (LI)

(72) Inventors: Manfred Klein, Kaufering (DE); Christian Förg, Lamerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 254 days.

(21) Appl. No.: 15/733,070

(22) PCT Filed: Nov. 22, 2018

(86) PCT No.: PCT/EP2018/082160
§ 371 (c)(1),
(2) Date: May 7, 2020

(87) PCT Pub. No.: WO2019/134772
PCT Pub. Date: Jul. 11, 2019

(65) Prior Publication Data
US 2021/0101319 A1    Apr. 8, 2021

(30) Foreign Application Priority Data

Jan. 3, 2018  (EP) .................................... 18150171

(51) Int. Cl.
*B29C 44/32* (2006.01)
*B29C 44/56* (2006.01)
(Continued)

(52) U.S. Cl.
CPC ........ *B29C 44/321* (2016.11); *B29C 44/5627* (2013.01); *E04B 1/947* (2013.01);
(Continued)

(58) Field of Classification Search
CPC .............. B29C 44/321; B29C 44/5627; B29K 2075/00; B29K 2995/0016; B29L 2031/003; B29L 2031/10
(Continued)

(56) References Cited

U.S. PATENT DOCUMENTS

2009/0223159 A1  9/2009  Colon
2018/0111361 A1  4/2018  Ober et al.

FOREIGN PATENT DOCUMENTS

EP    3 093 407    11/2016
JP    H7-4620 U    1/1995

OTHER PUBLICATIONS

International Search Report dated Feb. 5, 2019 in PCT/EP2018/082160.
Written Opinion dated Feb. 5, 2019 in PCT/EP2018/082160.

*Primary Examiner* — Jeffrey M Wollschlager
*Assistant Examiner* — Xue H Liu
(74) *Attorney, Agent, or Firm* — Grüneberg and Myers, PLLC

(57) ABSTRACT

A method of manufacturing includes providing a continuous flat cover to an assembly line, where the assembly line includes a conveying means. The method also includes applying a flowable reaction material continuously to the flat cover, where the reaction mixture is configured to expand within the flat cover. The method also includes welding the continuous flat cover around the reaction mixture to form an initial profile element. The method also includes cutting the initial profile element, continuously along the assembly line, to form one or more profile elements. Each of the one or more profile elements is a portion of the initial profile element, and each of the one or more profile elements includes a geometry for conforming with a construction component.

9 Claims, 4 Drawing Sheets

(51) Int. Cl.
    *E04B 1/94*           (2006.01)
    *E04C 2/292*        (2006.01)
    *E04C 2/32*          (2006.01)
    *B29K 75/00*        (2006.01)
    *B29L 31/00*        (2006.01)
    *B29L 31/10*        (2006.01)

(52) U.S. Cl.
    CPC .............. *E04C 2/292* (2013.01); *E04C 2/322*
           (2013.01); *B29K 2075/00* (2013.01); *B29K*
              *2995/0016* (2013.01); *B29L 2031/003*
                  (2013.01); *B29L 2031/10* (2013.01)

(58) Field of Classification Search
    USPC ......................................................... 264/46.5
    See application file for complete search history.

SYSTEMS AND METHODS OF FORMING A PROFILE ELEMENT FOR SEALING A METAL DECK

CROSS-REFERENCE TO RELATED APPLICATIONS

This application is a National Stage entry under § 371 of International Application No. PCT/EP2018/082160, filed on Nov. 22, 2018, and which claims the benefit of European Application No. 18150171.9, filed on Jan. 3, 2018, the contents of both of which are hereby incorporated by reference in their entireties.

BACKGROUND

The present disclosure relates generally to the field of construction, and more particularly to systems and methods for forming a profile element for sealing a metal deck against environmental factors.

In contemporary building constructions, different structural components (solid walls, floors, ceilings, etc.) contact one another at various intersections. For example, one such intersection within a contemporary building construction is the area between a top track and the ceilings. In certain situations, it may be helpful to seal the spaces (e.g., gap) around these intersections so that various environmental factors (e.g., noise, smoke, fire, etc.) are not transmitted through the gap. For example, sealant compounds such as mineral wool may be installed to seal the gap from such environmental factors. However, these and other typical sealant compounds utilized to seal the gap may be costly and time consuming to install. Furthermore, these and other typical sealant compounds may not be form fitted to the contours of the ceiling, thereby resulting in gaps remaining within these intersections.

Accordingly, there is a need for an element for sealing the gaps between a top track and a ceiling so that various environmental factors (e.g., noise, smoke, fire, etc.) are not transmitted through the gap. In particular, there is a need for a sealant element that is both cost effective to manufacture and efficient to install.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a method of manufacturing is provided. The method includes providing a continuous flat cover to an assembly line, where the assembly line includes a conveying means. The method also includes applying a flowable reaction material continuously to the flat cover, where the reaction mixture is configured to expand within the flat cover. The method also includes welding the continuous flat cover around the reaction mixture to form an initial profile element. The method also includes cutting the initial profile element, continuously along the assembly line, to form one or more profile elements. Each of the one or more profile elements is a portion of the initial profile element, and each of the one or more profile elements comprises a geometry for conforming with a construction component.

In a second embodiment, a system is provided. The system includes an assembly line having a conveying means. The system also includes a cover supply configured to continuously route a flat cover to the assembly line, and a welding unit disposed along the assembly line. The welding unit is configured to weld the flat cover to form a hollow receptacle. The system also includes a casting unit configured to continuously fill the hollow receptacle with a reaction mixture. The reaction mixture is configured to expand into the hollow receptacle to form an initial profile element. The system also includes a cutting unit configured to continuously cut the initial profile element to form one or more profile elements. Each of the one or more profile elements are cut to a geometry that is configured to conform with a construction component.

In a third embodiment, a system is provided. The system includes an assembly line comprising a conveying means and a cover supply configured to continuously route a flat cover to the assembly line. The system also includes a welding unit disposed along the assembly line. The welding unit is configured to weld the flat cover to form a hollow receptacle. The system also includes a casting unit configured to continuously fill the hollow receptacle with a reaction mixture. The reaction mixture is configured to expand into the hollow receptacle to form an initial profile element. The system also includes a cutting unit configured to continuously cut the initial profile element to form one or more profile elements. Each of the one or more profile elements are cut to a geometry that is configured to conform with a construction component.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
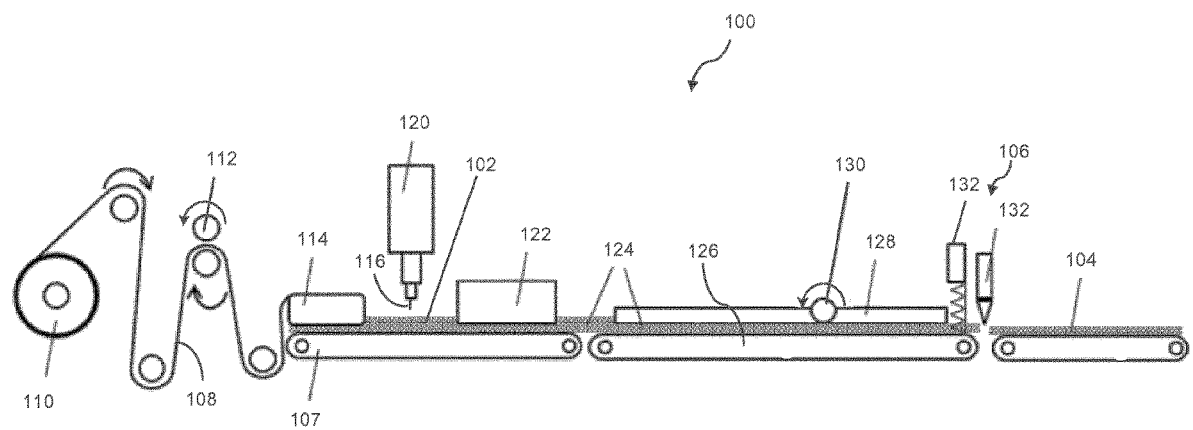
FIG. 1 is a schematic illustration of an embodiment of a manufacturing process for forming an initial profile element for sealing a gap in a building construction, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to a profile element for sealing gaps (e.g., spaces or voids) around and between various structural components (e.g., ceilings, walls, floors, etc.) in contemporary building constructions. Specifically, the profile element of the present embodiments may be described in relation to spaces or gaps between a ceiling component and a top track component. For example, in certain situations, the profile element of the present embodiments may be utilized to seal the flutes of a metal deck in dry wall configurations, such that various environmental factors (e.g., noise, smoke, fire, etc.) are not transmitted through the gaps. However, it should be noted that the present embodiments are not limited to the spaces between the ceiling component and an associated top track, but may be applicable and utilized to seal any spaces within a building, such as any spaces between any structural components (e.g., floors, ceilings, walls, etc.) of a building.

In certain embodiments, the profile element of the present disclosure may be manufactured as a pre-formed product having a "profile geometry." Specifically, the profile geometry of the profile element may be configured in any cross-section type, shape, or form. For example, the sealing regions of the profile element may be configured as a substantially round shape, oval shape, polygonal shape, square shape, rectangular shape, parallelogram shape, triangular shape, or any combination thereof. Accordingly, the overall cross-section of the profile element may be substantially a substantially round profile, oval profile, polygonal profile, square profile, rectangular profile, parallelogram profile, triangular profile, or any combination thereof. It should be noted that the profile element and/or the sealing region of the profile element may include other mixed configurations, such as, for example, a rectangular shape with rounded corners.

With the forgoing in mind, FIG. 1 is a schematic illustration of an embodiment of a manufacturing process 100 for forming an initial profile element 102 for sealing a gap around an expansion joint of a building construction. In particular, the present embodiments are related to manufacturing a continuous initial profile element 102, which may be divided into one or more profile elements 104 at the end of the manufacturing process 100, as further explained in detail below. Accordingly, the manufacturing of the one or more profile elements 104 may be done efficiently, at least in part because the manufacturing process is configured as a "non-stop" or continuous process that reduces the amount of manufacturing time for a single profile element 104. For example, manufacturing a continuous initial profile element 102 (e.g., endless foam profile), which may then be divided into one or more profile elements 104, may be more cost-advantageous, efficient, and economical than individually and independently manufacturing each profile element 104. The manufacturing process 100 of the profile element 104, including the cutting process 106, is further described in detail below.

In certain embodiments, the initial profile element 102 of the present disclosure may be manufactured as a continuous product with an assembly line 107 (e.g., conveyed along a belt or other conveying techniques). Specifically, as illustrated in FIG. 1, the assembly line 107 may include a flat film 108 supplied that is supplied from a film supply 110 by a feed apparatus. In certain embodiments, the flat film 108 may be passed over a rotating roll 112 where the flat film 108 is perforated with one or more needles. The perforations through the flat film 108 may be configured for ventilation during the reaction phase of the initial profile element 102 within the manufacturing process 100. In certain embodiments, the flat film 108 may be formed of a plastic film, or any other materials that determines the outer contour of the resulting profile element 104, and which allow for the expansion of the profile element 104 during the foaming process. For example, a paper foil, a woven fabric, a coated glass fibers, other plastic materials, or any other films and foils may be utilized in lieu of the flat film 108. In certain embodiments, the material of the flat film 108 (e.g., foil) may help secure an airtight fit when the profile element 104 is installed within a building construction, such as along a metal deck within a building construction.

Further, in certain embodiments, the assembly line 107 may include a shaping shoulder 114, and the flat film 108 may be passed over the shaping shoulder 114. The shaping shoulder 114 may be configured to shape the flat film 108 to receive a reaction mixture 116. In certain embodiments, the reaction mixture 116 may be a fire-resistant and/or an intumescent material. Specifically, the shaping shoulder 114 may configure the parallel sides of the flat film 108 "upright," such that the parallel sides of the flat film 108 are approximately at a right angle relative to the base on the flat film 108. In certain embodiments, the parallel sides of the flat film 108 are configured as a vessel that retains the reaction mixture 116. In particular, the reaction mixture 116 may be mixed and applied to the flat film 108 from a casting unit 120 in a uniform metering form. In certain embodiments, the reaction material 116 may be applied to the top side of the flat film 108, while in other embodiments, the intumescent material 116 may be applied to any region of the flat film 108 as the flat film 108 moves along the assembly line 107. The reaction mixture 116 may be a polyurethane material (e.g., mixture) that is capable of flow. For example, in certain embodiments, the reaction mixture 116 may spread and/or expand within the space of the flat film 108.

In certain embodiments, the assembly line 107 may include a thermal welding unit 122 configured to receive the flat film 108 (e.g., flat film 108 with the reaction mixture 116) and weld a first side of the flat film 108 with a second side of the flat film 108. For example, the thermal welding unit 122 may couple the two parallel sides of the flat film 108 together with a fish fin weld seam. In certain embodiments, the thermal welding unit 122 may be configured to weld portions of the flat film 108 based on a desired shape and geometry of the profile element 104. In certain embodiments, after the flat film 108 with the reaction mixture 116 passes through the thermal welding unit 122, the resulting welded flat film 108 may pass over a reaction segment 124 of the assembly line 107 where the reaction mixture 116 (e.g., polyurethane material) reacts and foams to achieve a desired profile shape and type. As noted above, the reaction mixture 116 may be an intumescent material, or any fire retardant material that is capable of flow.

Figure 2:
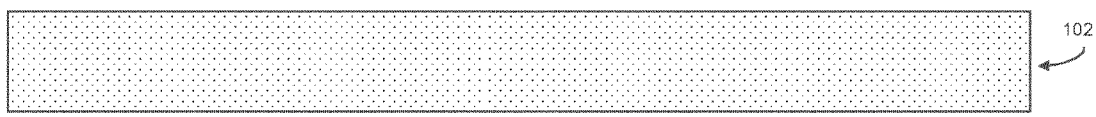
FIG. 2 is a top view of an embodiment of the initial profile element of FIG. 1, in accordance with aspects of the present disclosure.
Figure 3:
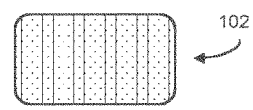
FIG. 3 is a side view of an embodiment of the initial profile element of FIG. 2, in accordance with aspects of the present disclosure.
Figure 6:
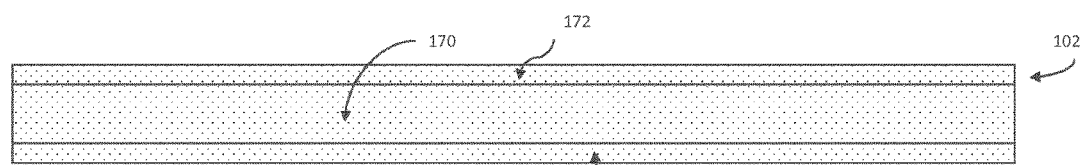
FIG. 6 is a top view of an embodiment of the initial profile element of FIG. 1, where the initial profile element includes a raised portion and two valleys, in accordance with aspects of the present disclosure.
Figure 7:
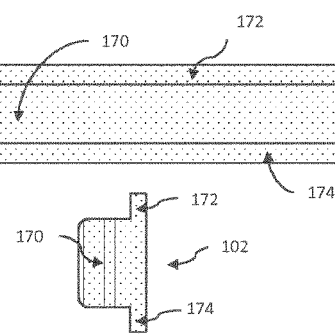
FIG. 7 is a side view of an embodiment of the initial profile element of FIG. 6, in accordance with aspects of the present disclosure.

In particular, it should be noted that various profile geometries may be achieved by controlling the reaction process within the reaction segment 124 and a shape 126 of the profile element 104. Specifically, the shape 126 of the profile element 104 may be facilitated by a profile unit 128 along the assembly line 107. For example, based on the desired geometry of the profile element 104, the profile unit 128 may be configured as a mold for the desired geometry. In this manner, during the reaction process, the reaction mixture 116 may expand into the shape 126 of the assembly line 107. In certain embodiments, based on the desired geometry of the profile element 104, the flat film 108 may be welded to help facilitate the expansion of the reaction mixture 116. For example, the profile geometry of the profile element 104 may be configured in any cross-section type, shape, or form. The sealing regions of the profile element 104 may be configured as a substantially round shape, oval shape, polygonal shape, square shape, rectangular shape, parallelogram shape, triangular shape, or any combination thereof. Accordingly, the overall cross-section of the initial profile element 102 may be substantially a round profile, oval profile, polygonal profile, square profile, rectangular profile, parallelogram profile, triangular profile, or any combination thereof. It should be noted that the initial profile element 102 and/or the sealing region of the profile element 104 may include other mixed configurations, such as, for example, a rectangular shape with rounded corners. For example, as illustrated in FIGS. 2-3, the initial profile element 102 may be substantially a rectangular profile. As a further example, as illustrated in FIGS. 6-7, the initial profile element 102 may be substantially a rectangular profile with two extensions, creating a raised portion and two valleys. Further, it should be noted that the shape and geometry of the profile element 104 may be directly based on the shape and geometry of the initial profile element 102. For example, as further described in detail with respect to FIGS. 2-9, the profile element 104 may be fabricated by cutting the initial profile element 102 into one or more sections.

In certain embodiments, the assembly process 100 includes a perforation unit 130 (e.g., a needle roll), which may be configured to ventilate the profile element 104 during the expansion of the intumescent material 116 into the profile unit 128 and the shaped film 108. Specifically, the second thermal welding unit 132 may be configured to weld a second initial profile element (e.g., provided from a second assembly line having a film supply, feed apparatus, shaping shoulder, casting unit, thermal welding unit, etc.) to the initial profile element 102. For example, the second thermal welding unit 132 may couple a second profile element to an upper or lower outer side of the initial profile element 102, thereby widening and expanding the profile element. In certain embodiments, the assembly process 100 includes an unrolling unit that is configured to apply adhesive tapes to the initial profile element 102. However, it should be noted that the adhesive tapes may additionally or alternatively be applied to the resulting profile elements 104.

The assembly process 100 further includes a cutting unit 132 configured to divide the initial profile element 102 into one or more profile elements 104. In particular, the cutting unit 132 may be configured to cut in a variety of directions and angles, such as horizontally, vertically, and/or diagonally through the initial profile element 102. For example, the cutting unit 132 may be configured to cut vertically through the initial profile element 102 to generate one or more profile elements 104 of a desired length. Further, the cutting unit 132 may be configured to cut horizontally and/or diagonally through the initial profile element 102, thereby generating one or more profile elements 104 of a desired shape and/or width, as further described with respect to FIGS. 2-9. Specifically, the initial profile element 102 may be fabricated as a continuous profile element along the assembly line 107. Indeed, such an assembly process and cutting process may help improve the overall efficiency of the manufacturing process of the profile elements 104, since multiple profile elements 104 are fabricated simultaneously.

FIG. 2 is a top view of an embodiment of the initial profile element 102 of FIG. 1, in accordance with aspects of the present disclosure. FIG. 3 is a side view of an embodiment of the initial profile element of FIG. 2, in accordance with aspects of the present disclosure. In the illustrated embodiments, the initial profile element 102 is a continuous profile composed of intumescent material 116 fabricated with the manufacturing process 100 (as described with respect to FIG. 1). In particular, the initial profile element 102 has a generally rectangular profile of uniform composition, and in certain embodiments, the initial profile element 102 may include rounded edges. During the manufacturing process 100, the cutting unit 132 may be configured to divide the initial profile element 102 into one or more profile elements 104, as further described below.

Figure 4:
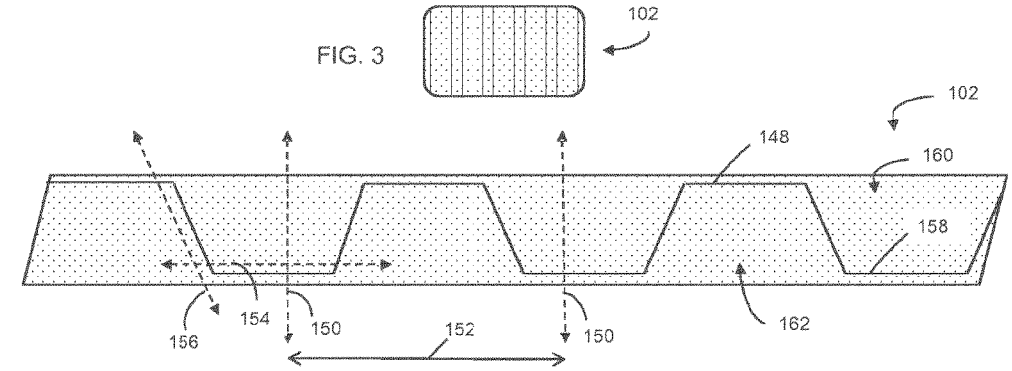
FIG. 4 is a top view of an embodiment of the initial profile element of FIG. 2, where the initial profile element includes a cut for dividing the initial profile element into two symmetrical profile elements, in accordance with aspects of the present disclosure.

FIG. 4 is a top view of an embodiment of the initial profile element 102 of FIG. 2, where the initial profile element 102 includes one or more cuts 148 for dividing the initial profile element 102 into two symmetrical profile elements (e.g., a first profile element 160 and a second profile element 162). As noted above, the initial profile element 102 may be divided into one or more profile elements 104 along the assembly line 107. Specifically, the cutting unit 132 disposed along the assembly line 107 may be configured to cut the continuous initial profile element 102 in one or more directions along one or more different axes. For example, in certain embodiments, the cutting unit 132 may be configured to cut at one or more locations along a vertical axis 150 through the initial profile element 102 to generate one or more profile elements 104 at a desired length 152. As a further example, in certain embodiments, the cutting unit 132 may be configured to cut at one or more locations along a horizontal axis 154 and/or along a diagonal axis 156 within and/or through the initial profile element 102. In particular, the cutting unit 132 may be configured to cut continuously through and/or within the initial profile element 102, thereby creating one or more profile elements 104 continuously along the assembly line 107.

In certain situations, the cutting unit 132 may be configured to move in one or more directions as the initial profile element 102 is conveyed along the assembly line 107 in a single direction. In certain embodiments, the cutting unit 132 may be configured to remain stationary as the assembly line 107 is configured along a path to enable one or more desired cuts within or through the initial profile element 102. Further, in certain embodiments, the cutting unit 132 and/or the assembly 107 may each be configured to operate cohesively to enable one or more desired cuts within or through the initial profile element 102. For example, the assembly line 107 may be configured to move at a right angle (e.g., perpendicular) relative to the position of the cutting unit 132 to achieve one or more diagonal cuts within and/or through the initial profile element 102. In this manner, any desired shape and dimensions may be achieved for the one or more profile elements 104.

Figure 5:
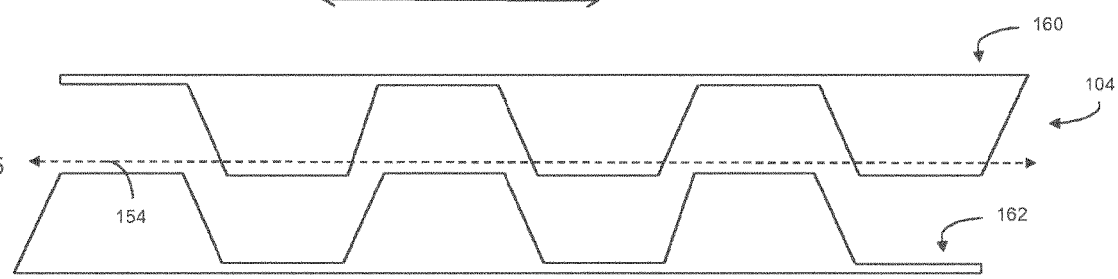
FIG. 5 is a top view of an embodiment of the two symmetrical profile elements of FIG. 4, in accordance with aspects of the present disclosure.

For example, in the illustrated example, one or more continuous cuts 148 may be made through and/or within the initial profile element 102 along a path 158 to fabricate two profile elements (e.g., a first profile element 160 and a second profile element 162) that are generally symmetrical along the horizontal axis 156, as further described with respect to FIG. 5.

FIG. 5 is a top view of an embodiment of the two symmetrical profile elements 104 (e.g., the first profile element 160 and the second profile element 162) of FIG. 2. Specifically, the first profile element 160 and the second profile element 162 may be fabricated with the manufacturing process 100 described with respect to FIGS. 1-2. In particular, the one or more continuous cuts 148 along the path 158 may be configured to form two profile elements 104 that are generally symmetrical along the horizontal axis 154. In certain embodiments, the two profile elements 104 may be transported such that the surfaces along the one or more continuous cuts 148 are in contact with each other, thereby reducing the amount of surface area during packaging and shipping these components.

FIG. 6 is a top view of an embodiment of the initial profile element 102 of FIG. 1, where the initial profile element 102 includes a raised portion 170 and two valleys (e.g., a first valley 172 and a second valley 174), in accordance with aspects of the present disclosure. FIG. 7 is a side view of an embodiment of the initial profile element 102 of FIG. 6, in accordance with aspects of the present disclosure. Specifically, in the illustrated embodiments of FIGS. 6 and 7, the initial profile element 102 includes a generally rectangular profile of uniform composition coupled to two appendage portions that form the first valley 172 and the second valley 174. The two appendage portions are positioned on opposite sides of the rectangular profile. As noted above, the initial profile element 102 may be shaped in any profile that is conducive to creating a tight seal within construction components.

Figure 8:
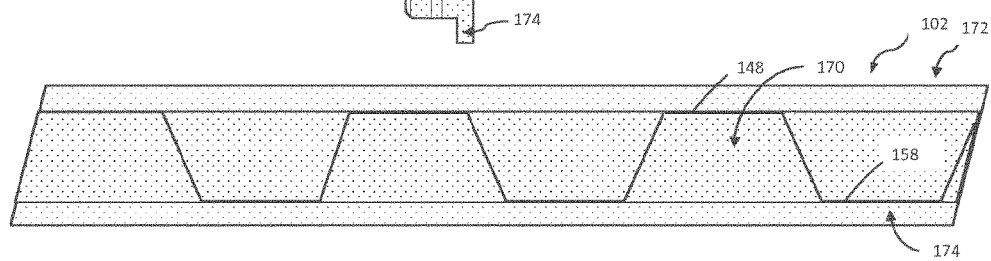
FIG. 8 is a top view of an embodiment of the initial profile element of FIG. 6, where the initial profile element includes a cut for dividing the initial profile element into two symmetrical profile elements, in accordance with aspects of the present disclosure.

FIG. 8 is a top view of an embodiment of the initial profile element 102 of FIG. 6, where the initial profile element 102 includes one or more cuts 148 for dividing the initial profile element 102 into two symmetrical profile elements (e.g., the first profile element 160 and the second profile element 162), in accordance with aspects of the present disclosure. As noted above, the initial profile element 102 may be divided into one or more profile elements 104 along the assembly line 107. Specifically, the cutting unit 132 disposed along the assembly line 107 may be configured to cut the continuous initial profile element 102 (such as the embodiment of the initial profile element illustrated in FIGS. 6 and 7). For example, the cutting unit 132 may be configured to cut at one or more locations along the path 158. The cutting unit 132 may cut to achieve two symmetrical profile elements (e.g., the first profile element 160 and the second profile element 162) that are of a desired geometry.

In certain embodiments, the cutting unit 132 may cut along the path 158 through the raised portion 170, thereby creating a profile that conforms precisely to the metal profile of the construction components. In this manner, the generated profile element 102 may be a pre-formed component that is designed to fit into a designated construction component in a tight seal. In certain embodiments, the cutting unit 132 may be configured to cut through other regions of the initial profile element 102, such as along the valley regions 172, 174 and/or along both the raised portion 170 and the valley regions 172, 174. Indeed, it should be noted that the cutting unit 132 may be configured to cut along any directional path 158 through the continuous initial profile element 102. Furthermore, it should be noted that the cutting unit 132 may be configured to cut along any axes relative to the direction of the assembly line 107.

Figure 9:
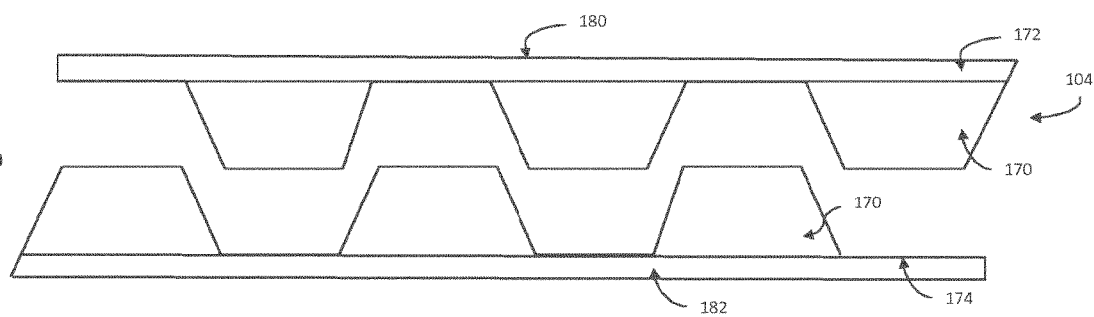
FIG. 9 is a top view of an embodiment of the two symmetrical profile elements of FIG. 8, in accordance with aspects of the present disclosure.

FIG. 9 is a top view of an embodiment of the two symmetrical profile elements 102 (e.g., a first profile element 180 and a second profile element 182) of FIG. 8, in accordance with aspects of the present disclosure. Specifically, the first and second profile elements 180, 182 may be fabricated with the manufacturing process 100 described with respect to FIGS. 1-2. In particular, the resulting symmetrical profile elements 104 may be differently shaped based on the differences in the initial profile element 102. For example, each symmetrical profile element 104 may include a raised portion 170 flanked by one of the two valley portions 172, 174. The geometry of the resulting symmetrical profile element 104 may be suitable for configuring the profile element 104 against a construction element (e.g., metal deck, metal component, floor component, etc.)

Figure 10:
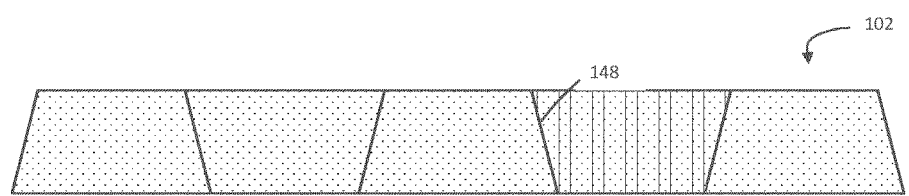
FIG. 10 is a top view of an embodiment of the initial profile element of FIG. 2, where the initial profile element includes a cut for dividing the initial profile element into a plurality of symmetrical profile elements, in accordance with aspects of the present disclosure.
Figure 11:
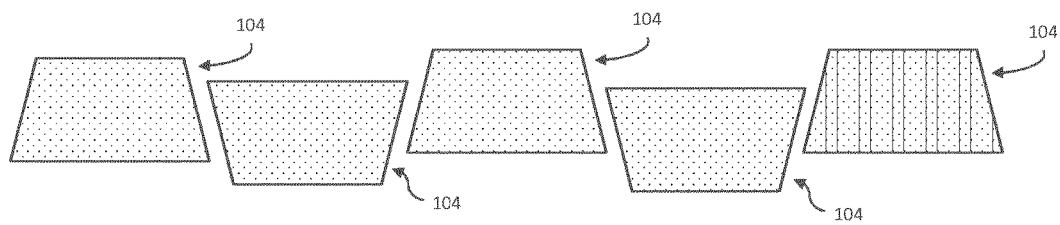
FIG. 11 is a top view of an embodiment of the plurality of symmetrical profile elements of FIG. 10, in accordance with aspects of the present disclosure.

FIG. 10 is a top view of an embodiment of the initial profile element 102 of FIG. 2, where the initial profile element 102 includes one or more cuts 148 for dividing the initial profile element 102 into a plurality of symmetrical profile elements. In the illustrated embodiment, the continuous cut 148 is configured to generate five profile elements. However, in other embodiments, it should be noted that any number of profile elements (e.g., 2, 3, 4, 6, 7, 8, 9, 10 or more) may be formed. Further, in the illustrated embodiment, the one or more cuts 148 may be made through the length of the initial profile element 102, so that trapezoidal shapes of the profile elements 104 are generated without a connecting portion (e.g., valley 172) that runs the length of two or more profile elements 102. FIG. 11 is a top view of an embodiment of the plurality of symmetrical profile elements 104 formed from the cuts 148 of FIG. 10.

Technical advantages of the present disclosure include a pre-formed fire-resistant element having a "profile geometry" in any cross-section type, shape, or form. The pre-formed fire-resistant element may configured for sealing spaces or gaps between a ceiling component and a top track component. In certain embodiments, the fire-resistant element may include intumescent material. The pre-formed fire-resistant element may be formed continuously along an assembly line. For example, an initial profile element 102 may be manufactured as a continuous product with an assembly line 107 (e.g., conveyed along a belt or other conveying techniques). Further, among other steps, the initial profile element 102 may be continuously cut along the assembly line to divide the initial profile element 102 into two or more symmetrical profile elements. Accordingly, the resulting profile element may be configured for sealing the gaps between a top track and a ceiling so that various environmental factors (e.g., noise, smoke, fire, etc.) are not transmitted through the gap. In particular, the resultant profile element is both cost effective to manufacture and efficient to install.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of manufacturing, comprising:
   providing a continuous flat cover to an assembly line, wherein the assembly line comprises:
      a conveyor;
   applying a flowable reaction material continuously to the continuous flat cover, wherein the flow/able reaction material is configured to expand within the continuous flat cover;
   welding the continuous flat cover around the flowable reaction material to form an initial profile element; and
   cutting the initial profile element, continuously and lengthwise along the assembly line, to form one or more profile elements,
   wherein each of the one or more profile elements is a portion of the initial profile element, and
   wherein each of the one or more profile elements comprises:
      a geometry for conforming with a construction component.

2. The method of manufacturing of claim 1, further comprising:
   passing the continuous flat cover over a perforation unit along the assembly line, wherein the perforation unit perforates the continuous flat cover with one or more ventilation holes.

3. The method of manufacturing of claim 1, further comprising:
   passing the continuous flat cover over a shaping shoulder disposed along the assembly line, wherein the shaping shoulder is configured to shape a hollow receptacle into the geometry for conforming with the construction component.

4. The method of manufacturing of claim 1, wherein the construction component comprises:
   a flute of a metal deck,
   a metal component,
   a floor component, or a combination thereof.

5. The method of manufacturing of claim 4, wherein the construction component is configured to seal the flute of the metal deck from noise, smoke, fire, or a combination thereof.

6. The method of manufacturing of claim 1, wherein continuously cutting the initial profile element along the assembly line comprises:
   cutting the initial profile element to one or more different lengths.

7. The method of manufacturing of claim 1, wherein continuously cutting the initial profile element along the assembly line comprises:
   cutting the initial profile element into one or more uniform shapes and sizes.

8. The method of manufacturing of claim 1, wherein continuously cutting the initial profile element along the assembly line comprises:
   cutting the initial profile element to generate two symmetrical profile elements.

9. The method of manufacturing of claim 1, wherein continuously cutting the initial profile element along the assembly line comprises:
   cutting the initial profile element along a vertical, diagonal, or horizontal axis relative to the assembly line.

* * * * *